(12) United States Patent
Yoshikoshi

(10) Patent No.: US 9,477,400 B2
(45) Date of Patent: Oct. 25, 2016

(54) METHOD AND APPARATUS FOR NAVIGATION SYSTEM FOR SELECTING ICONS AND APPLICATION AREA BY HAND DRAWING ON MAP IMAGE

(75) Inventor: Tetsutaro Yoshikoshi, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 1624 days.

(21) Appl. No.: 12/456,104

(22) Filed: Jun. 11, 2009

(65) Prior Publication Data

US 2010/0318573 A1    Dec. 16, 2010

(51) Int. Cl.
*G06F 3/048* (2013.01)
*G06F 3/0488* (2013.01)
*G01C 21/36* (2006.01)
*G06F 3/01* (2006.01)
*G06F 3/0484* (2013.01)

(52) U.S. Cl.
CPC ....... *G06F 3/04883* (2013.01); *G01C 21/3611* (2013.01); *G06F 3/017* (2013.01); *G06F 3/04842* (2013.01)

(58) Field of Classification Search
CPC . G06F 3/04883; G06F 3/017; G06F 3/04842
USPC .................................. 715/810, 863
See application file for complete search history.

(56) References Cited

U.S. PATENT DOCUMENTS

| | | | |
|---|---|---|---|
| 6,856,901 B2* | 2/2005 | Han | 701/211 |
| 6,983,203 B1* | 1/2006 | Wako | 701/533 |
| 7,259,752 B1* | 8/2007 | Simmons | 345/173 |
| 8,212,784 B2* | 7/2012 | Popp | 345/173 |
| 2002/0141643 A1* | 10/2002 | Jaeger | 382/181 |
| 2009/0097414 A1* | 4/2009 | Yoon et al. | 370/254 |
| 2009/0177384 A1* | 7/2009 | Walder | 701/208 |
| 2010/0169841 A1* | 7/2010 | Singh | 715/863 |
| 2011/0022393 A1* | 1/2011 | Waller et al. | 704/270 |

FOREIGN PATENT DOCUMENTS

| | | |
|---|---|---|
| JP | 2005-339420 | 12/2005 |
| JP | 2008-180786 | 8/2008 |

\* cited by examiner

*Primary Examiner* — Ajay Bhatia
*Assistant Examiner* — Phuong Nguyen
(74) *Attorney, Agent, or Firm* — Marumatsu & Associates

(57) ABSTRACT

A method and apparatus for displaying desired icons on an applicable area on a screen of a navigation system by a character and symbol drawing that is hand-written by a user on the screen. The method includes the steps of: evaluating a character & symbol drawing that is hand-written by the user to determine a category of the icons intended by the user; determining an applicable area on the map image for applying an icon display operation based on the character & symbol drawing; checking a prescribed data table based on the category of the icons and the applicable area selected by the character & symbol; and changing the manner of displaying the icons with respect to the category and applicable area determined by the foregoing process.

20 Claims, 11 Drawing Sheets

Fig. 4A
(1)
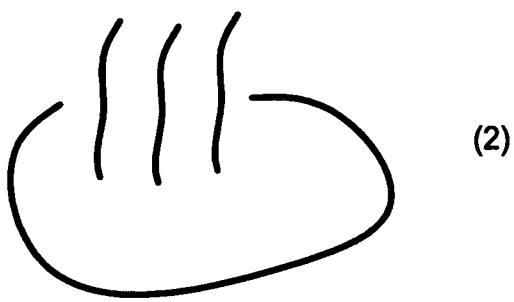
(2)
Fig. 4B
| Icon category | Character/Symbol | Combined drawing |
|---|---|---|
| Gas station | G | V |
| Parking | P | |
| Fast Food | F | |
| Chinese food | C | |
| Italian food | I | |

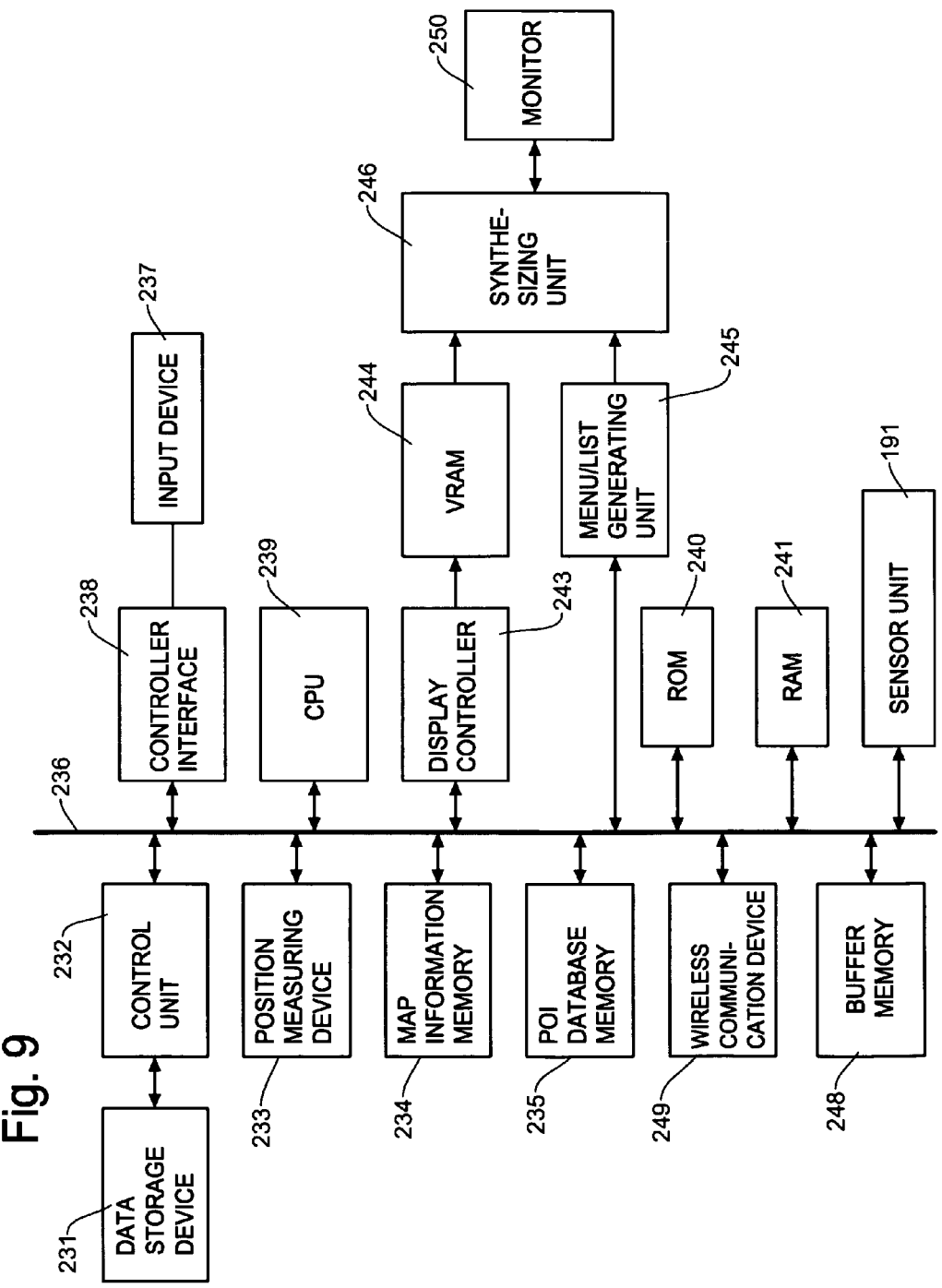

METHOD AND APPARATUS FOR NAVIGATION SYSTEM FOR SELECTING ICONS AND APPLICATION AREA BY HAND DRAWING ON MAP IMAGE

FIELD OF THE INVENTION

This invention relates generally to a method and apparatus for displaying icons for a navigation system, and more particularly, to a method and apparatus for displaying desired icons on an applicable area on a display screen of a navigation system by a character and symbol drawing that is hand-written by a user on the screen.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), a hard disc, or from a remote server.

Typically, the navigation system displays a map image on a monitor screen while superimposing thereon a mark representing the current location of the user. Such algorithm as A* search algorithm and its variants are generally used to search and calculate a route to a destination. A user is able to watch a map on a display of the navigation system where the map provides information such as streets, current location of the vehicle, and points of interest (POI), etc.

One of the typical functions that is considered useful in operations of a navigation system is an ability to display various icons on a map image. FIG. 1A is a schematic diagram showing an example of display of the navigation system where various icons are superimposed on a map image. As is known in the art, an icon is a small symbol on a computer, TV screen, or a display of other electronic device such as a navigation system that represents an object in a simplified manner.

As shown in FIG. 1A, in an application to the navigation system, icons typically represent with their unique business types, for example, restaurants, gas stations, parking areas, ATM machines, etc. on a map image 25. Some icons show generic category of POI (Point of Interest) such as gas station, restaurants, while other icons show a specific business or brand of POI. Since such icons give intuitive information as the type and location of the POIs or other places on the map image, various icons are now frequently used for navigation systems.

In the example of FIG. 1B, however, several icons 31A and 31B are clustered or overlapped on the map image 25 where a vehicle locator 21 on the map image 25 indicates a current vehicle position (VP). As shown, when two or more icons are clustered to the same or nearby location on the map image 25, they can be hardly distinguishable. For example, in a downtown area or a shopping area where many restaurants or stores are located in the similar locations, the icons indicating the restaurants or stores may be overlapped with one another such that each icon is not easily identifiable by the user.

Moreover, in applications of a navigation system, a user does not necessarily need to know all of the icons in an area on the map image. For instance, one may want to see only a specific category of icons such as gas station icons or old monument icons when the user is in the sightseeing trip. Thus, it is desired that such operation of displaying the icons be performed easily and intuitively for a navigation system depending on the needs and circumstances associated with the user.

SUMMARY OF THE INVENTION

It is, therefore, an object of the present invention to provide a method and apparatus for displaying icons representing a type of places of interest for a navigation system which is capable of selectively displaying or not displaying the icons based on a character & symbol drawing which is hand-written by a user.

It is another object of the present invention to provide a method and apparatus for displaying icons for a navigation system which is capable of selectively displaying or not displaying the icons based on a character & symbol drawing which is hand-written by a user while applying such a display operation to an applicable area on the monitor screen defined by the user.

It is a further object of the present invention to provide a method and apparatus for displaying icons for a navigation system which is capable of selectively displaying or not displaying the icons based on a character & symbol drawing which is hand-written by creating a prescribed data table for interpreting the category of icons based on the character and symbol drawing.

One aspect of the present invention is a method for selectively displaying icons on a map image for a navigation system. The method includes the steps of: checking whether a map image is displayed on a monitor screen of a navigation system; detecting an activity of hand-writing a character & symbol drawing on the map image by a user; evaluating the character & symbol drawing that is hand-written by the user to determine a category of the icons intended by the user with respect the map image; determining an applicable area on the map image for applying an icon display operation based on the character & symbol drawing specified by the user; checking a prescribed data table based on the category of the icons and the applicable area selected by the character & symbol by the user in the foregoing steps; and changing the manner of displaying the icons on the map image with respect to the category and applicable area determined by the character & symbol drawing.

The method of the present invention for displaying the icons further includes a step of creating the data table listing information regarding relationships between predefined character & symbols and categories of icons so that the category of icons intended by the user is determined by comparing the character & symbol that is hand-written by the user with the information in the data table.

The method further includes a step of determining whether the navigation system is in a drawing reception condition when the user has hand-written the character & symbol on the map image where the drawing reception condition includes a condition where a map scale is appropriate for displaying icons on the monitor screen.

In the method of the present invention for displaying the icons, the step of changing the manner of displaying the icons on the map image includes a step of either displaying the selected category of icons or avoiding from displaying the selected category of icons on the applicable area on the map image. In the method, the step of avoiding from displaying the selected category of icons includes a step of hand-writing a cross-out mark over the character & symbol drawing on the map image on the monitor screen.

Further, in the method of the present invention, the step of changing the manner of displaying the icons on the map image includes a step of displaying the selected category of icons on the applicable area on the map image where no icons are previously displayed.

In the present invention, the character & symbol drawing is an alphabetical letter associated with a category of icons or a symbol figure related to a function of a particular place and is interpreted by the information listed in the prescribed data table.

In the method of the present invention for displaying the icons, the applicable area for applying the icon display operation is determined based on an outer size or shape of the character & symbol drawing that is hand-written by the user. Further, the applicable area for applying the icon display operation is determined based on an outer size or shape of the hand-written character & symbol drawing and a center point of the character & symbol drawing by producing a circle or a rectangle shape with reference to the center point that is larger than the outer size or shape of the character & symbol drawing.

Furthermore, in the method of the present invention for displaying the icons, the applicable area for applying the icon display operation is determined based on an outer size of the character & symbol drawing that is hand-written by the user and is adjusted by the user by dragging a corner point of the applicable area.

Another aspect of the present invention is an icon display apparatus for a navigation system to selectively display or not to display the icons based on a character & symbol drawing which is hand-written by a user on a monitor screen of the navigation system. The icon display apparatus includes various means for implementing the operational steps incorporated in the icon display method described above. Thus, the user of the navigation system is able to distinguish information regarding a particular type of icons from that of the other when the icons are clustered to the same or nearby location on the map image, since the apparatus of the present invention enables to show only the desired type of icons on the screen.

According to the icon display method and apparatus of the present invention, the navigation system is able to display or avoid to display the selected category of icons based on the character & symbol drawing which is hand-written by the user. The navigation system is capable of selectively displaying or not displaying the icons based on the character & symbol drawing written by the user while applying the icon display operation to an applicable area on the monitor screen defined by the user. The navigation system allows the user to create a prescribed data table for interpreting the category of icons based on the character and symbol drawing. Thus, the user of the navigation system is able to distinguish information regarding a particular type of icons from that of the other icons when the icons are clustered to the same or nearby location on the map image, since the apparatus of the present invention enables to show only the desired type of icons on the screen.

BRIEF DESCRIPTION OF THE DRAWINGS

FIG. 2A shows a display in which a plurality of icons are overlapped with one another, FIG. 2B shows a display in which a character & symbol is drawn on an area where the icons are overlapped as shown in FIG. 2A, FIG. 2C shows a display similar to FIG. 2B except that an applicable area is represented by dotted lines, and FIG. 2D is a display showing only certain icons as a result of hand-writing the character & symbol drawing.

FIG. 3A shows a display in which a character & symbol is drawn on the display where no icon is displayed, and FIG. 3B shows a display illustrating icons as a result of drawing the character & symbol.

FIG. 4A is a schematic diagram showing examples of character & symbol drawing that are not based on alphabetical characters, and FIG. 4B is an example of data table that includes icon categories, character & symbol drawings representing the corresponding icons, and character & symbol drawings each representing a plurality of icons.

FIG. 7A shows a plurality of icons and a character & symbol drawing, and FIG. 7B shows a resultant display in which a character & symbol drawing is used to eliminate certain icons from the map image on the display.

FIG. 9 is a functional block diagram showing an example of structure of a vehicle navigation system implementing the method of the present invention for selecting icons by hand-writing on the screen.

DETAILED DESCRIPTION OF THE PREFERRED EMBODIMENT

Figure 1A:
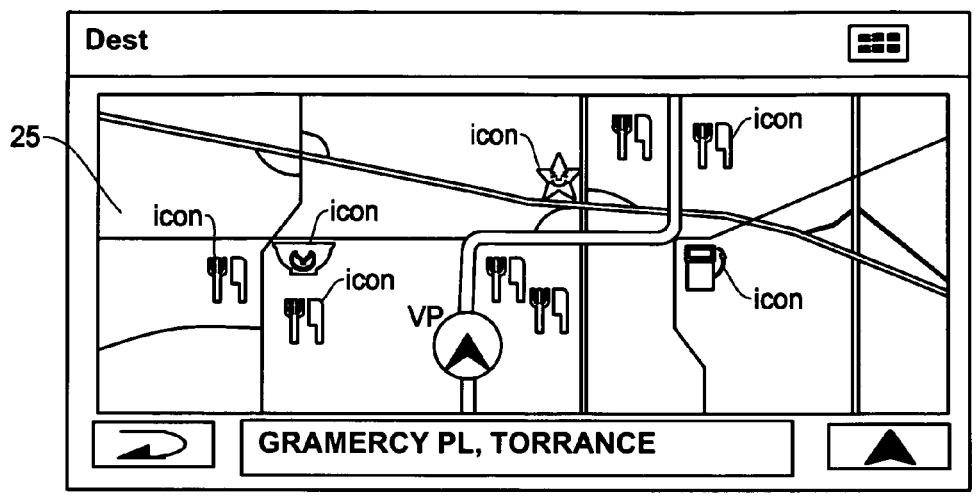
FIG. 1A is a schematic diagram showing an display example of a navigation screen where various icons are displayed on the map image.
Figure 1B:
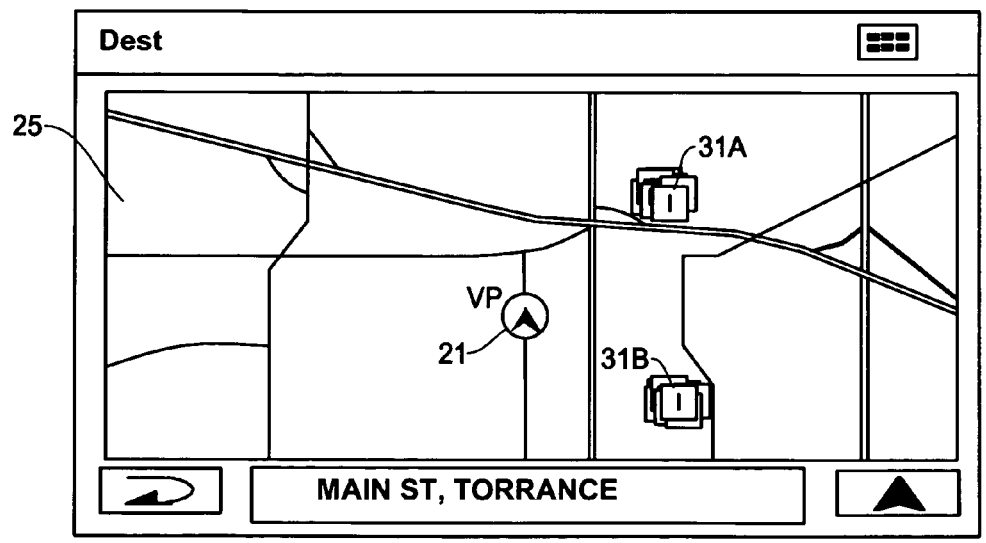
FIG. 1B is a schematic diagram showing a problem associated with a conventional navigation screen where a plurality of icons are overlapped at the similar locations on the map image.

The method and apparatus of the present invention for selecting icons by hand-writing (hand-drawing) a character or a symbol on the monitor screen (map image) is described in detail with reference to the accompanying drawings. In the present invention, a user hand-writes a pattern or a character (hereafter "character & symbol drawing" on an image of the navigation screen such as a touch screen, a multi-touch, or a touch pad. A pattern recognition program detects a user's hand-writing, i.e., a character & symbol drawing, and matches the drawing to a predetermined category of icons to carry out the icon display process. A range or area to apply the icon selection or de-selection operation (hereafter "applicable area") is set at the same time as the user writes the character & symbol drawing.

Although the present invention is applicable to a wide array of navigation systems as well as computer mapping software implementation, an example of a vehicle navigation system will be mainly described as a preferred embodiment. However, it should be apparent to persons skilled in this field that the present invention is applicable to many other systems. For example, the present invention is applicable to a portable navigation system, a cell phone, laptop computer, PDA, etc., having a GPS function.

FIGS. 2A to 2D are display examples showing the operational process of the present invention for selecting icons by using a character & symbol drawing that is hand-written by the user. The display has a capability to allow the user to input or otherwise interact with the navigation system by touching or contacting the surface of the display, such as a touch screen or multi-touch interface. As shown on the map image of FIG. 2A, in many cases, a plurality of icons are overlapped with one another as icon clusters 33 since the icons are located too close to one another on the map image on the navigation display.

Since many icons can be located in a small area on the map image, the icons are overlapped and much of the information on the icons would be indiscernible. Because of such poor visibility, the user may not be able to retrieve any meaningful information from the icons overlapped with one another. In a practical application, however, the user does not need to know all of the information on the map image but needs only a particular type of icons such as a gas station icon and its location.

Figure 2A:
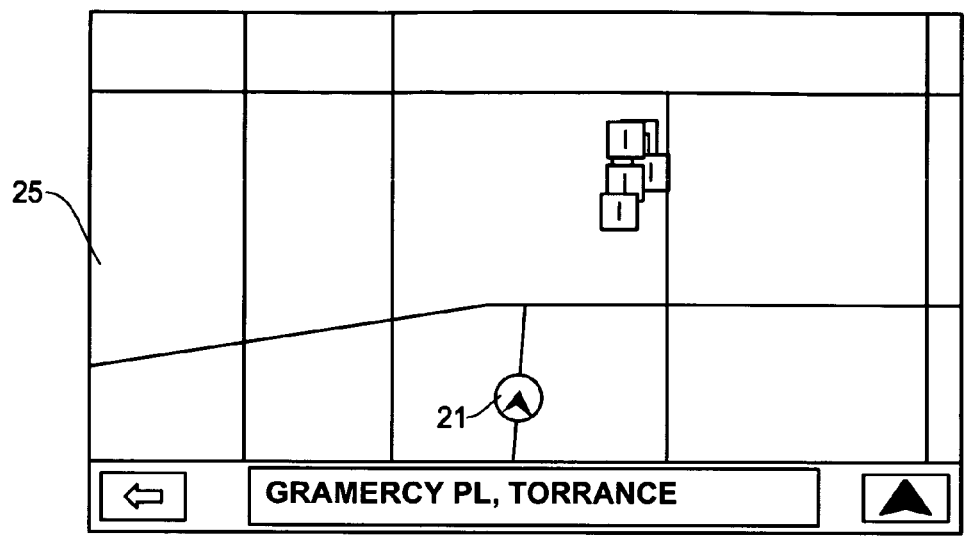
FIGS. 2A to 2D are display examples showing the operational process of the present invention for selecting icons by hand-writing a character & symbol drawing where
Figure 2B:
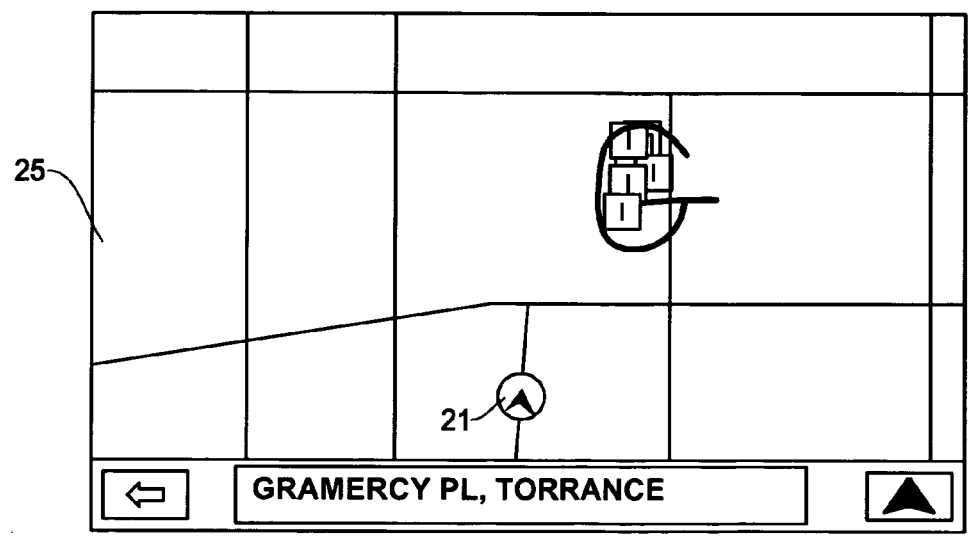

FIG. 2B shows an example of display screen in which a character & symbol drawing is written on a touch screen at an area where the icons are overlapped. The character & symbol drawing in FIG. 2B is a recognizable character "G" which is hand-written by the user on the display screen. The character & symbol drawing in the present invention can be any symbol or character that represents a certain icon category or a command for selecting icons. In this example, the character "G" represents a POI category of gas station. Other symbols, such as "R" representing "restaurants", and "P" representing "parking", etc., may be used as well.

Figure 2C:
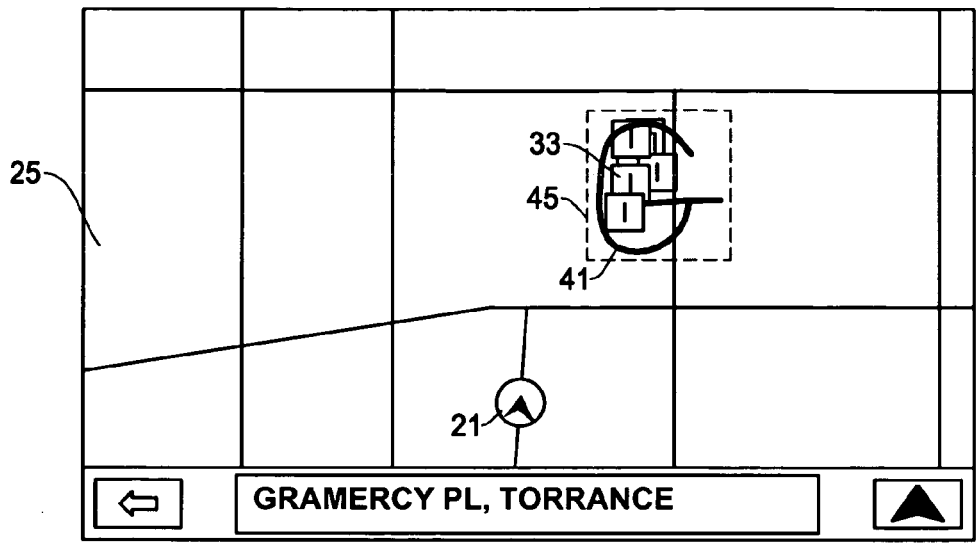
Figure 2D:
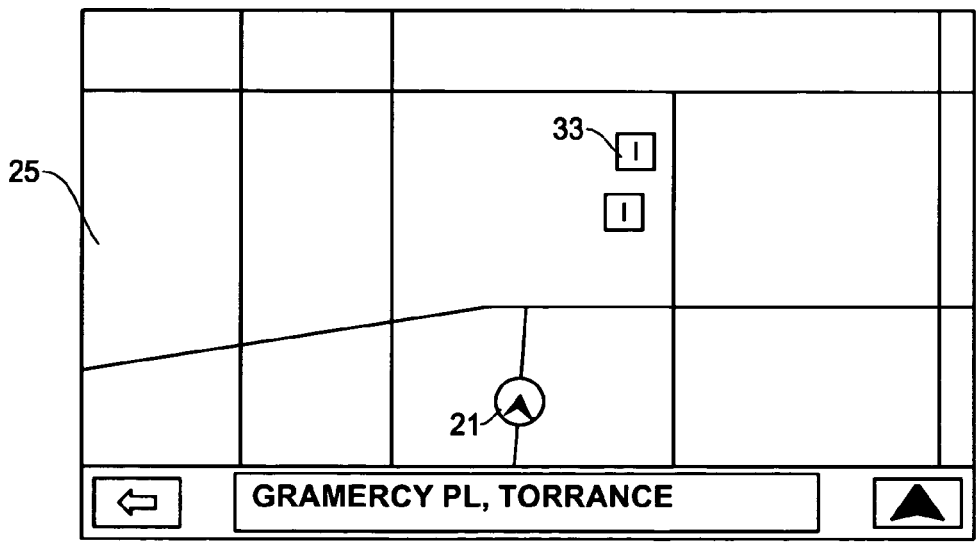

FIG. 2C shows an example of display screen which is similar to that of FIG. 2B except that an applicable area or range is represented by dotted lines. FIG. 2D shows an example of display having only limited icons as a result of the character & symbol drawing executed by the user on the display screen. As the user has hand-written the character & symbol drawing "G" on the display screen, the navigation system will determine the meaning (ex. gas stations) of the character & symbol drawing 41 that is input by the user.

In the present invention, a type of character & symbol drawing and a dynamic motion made by the user during the drawing procedure are evaluated to recognize the icons that are intended by the user. The navigation system will search the database to find a matching entry or icons in response to the inputted character & symbol drawing 41. In the example of FIGS. 2A-2D, as noted above, the symbol & character drawing written by the user is recognized as a category of "gas stations" because of the character "G".

Next, the navigation system will determine an applicable area, namely, a range to apply the icon selection or de-selection operation based on the size of the hand-written drawing. Referring to FIG. 2C, an applicable area 45 is shown by the dotted lines that surrounds the symbol & character drawing 41 which is the character "G". In this example, the dotted lines representing the applicable area 45 is actually illustrated on the screen to describe the applicable area. However, in an actual embodiment, the applicable area may or may not be shown on the display of the navigation system.

The applicable area is typically an automatic response to the size of the symbol & character drawing 41 ("G") which is hand-written on the screen by the user. The details of determining the size and shape of the applicable area will be described later with reference to FIGS. 6A-6d. FIG. 2D shows the results of writing the character & symbol drawing "G" on the screen in the above-mentioned steps. As shown, the number of icons 33 displayed in the applicable area 45 is reduced to two gas station icons.

In the above example, the type of icons to be displayed in the area is defined by the character & symbol drawing to reduce the number of the icons to be displayed. The present invention can be also used to display certain icons on an area that has not previously displayed any icons. In other words, even when the screen is not in a mode of displaying icons, the icons in the selected category will be displayed after hand-writing the character & symbol drawing on the map image on the screen.

Figure 3A:
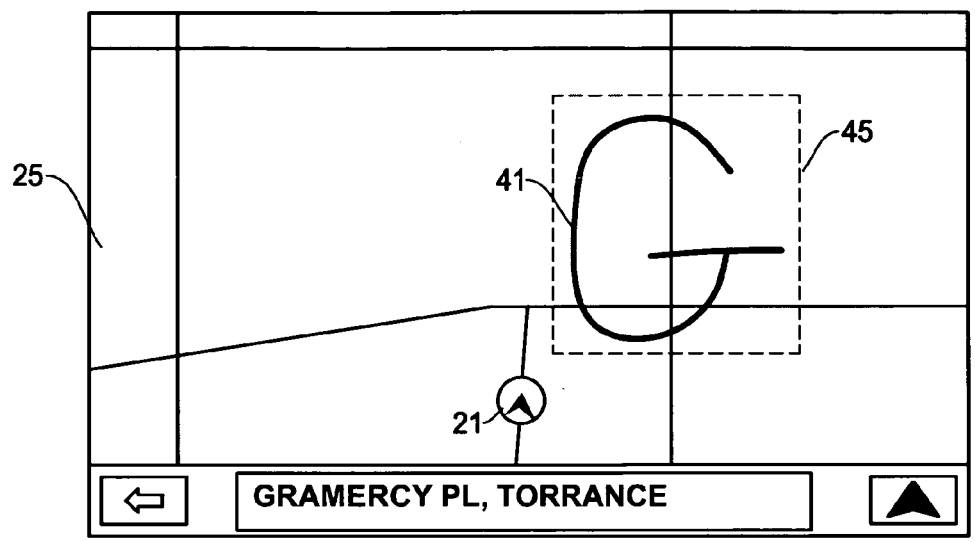
FIGS. 3A and 3B are schematic diagrams showing another example of the operational process of the present invention for selecting icons by using a character & symbol drawing, where
Figure 3B:
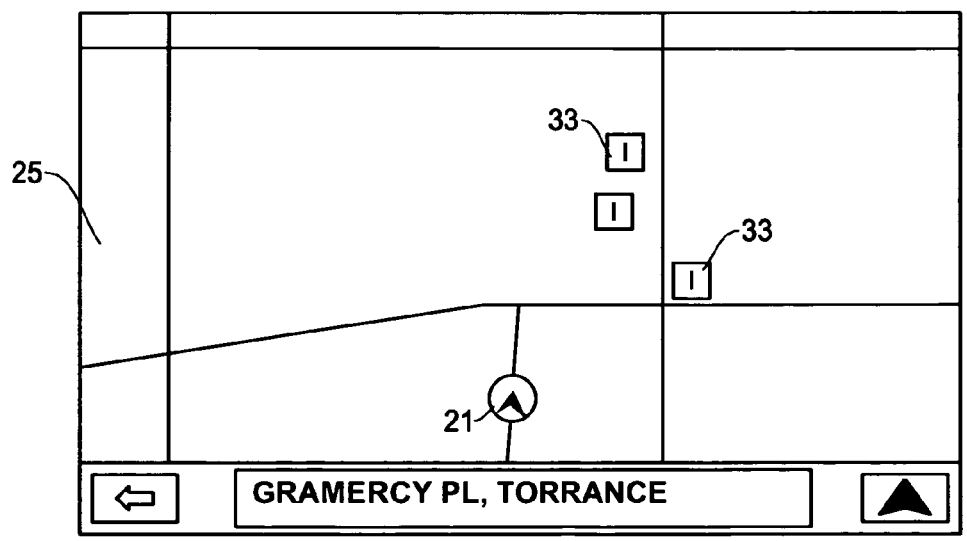

Such an example is shown in schematic diagrams of FIGS. 3A and 3B where there is no icons displayed on an original screen and will be displayed after hand-writing the character & symbol drawing. Referring to FIG. 3A, the user has drawn the character & symbol drawing "G" on the map area where there is no icon displayed. After the navigation system recognizes the character & symbol drawing as to the meaning or category of icons and the applicable area, it will show the matching icons in the applicable area. Thus, as shown in FIG. 3B, icons 33 representing the gas stations are displayed in the applicable area where there was no icon displayed in the previous screen.

The character & symbol drawing is not limited to the above examples, but may take many variations, for example, a letter "P" may be used for presenting parking areas or structures and a letter "B" may be used for presenting banks, etc. Further, the character & symbol drawing can be based on a symbolic figure related to a function of a place related to the icon rather than an alphabet character. For instance, a symbolic figure representing a dish as shown by an example (1) of FIG. 4A may represent restaurants, and a symbolic figure representing a bath as shown by an example (2) of FIG. 4A may represent hot spring hotels or inns.

Moreover, although a category of icon is represented by en corresponding hand-written drawing in the foregoing example, two or more icon categories may be represented by one character & symbol drawing. FIG. 4B shows an example of a table that describes icon categories, and character & symbol drawings that correspond to the icon categories. As can be seen from FIG. 4B, the table contains a single character & symbol drawing that represents icons of two or more different categories.

For instance, gas station icons are represented by "G", and parking icons are represented by "P", respectively, in the above examples. Alternatively, it is also possible that both the gas station and the parking icons are represented by a common symbol or character such as a letter "V" as in the table of FIG. 4B. Thus, by hand-writing the character & symbol drawing "V", both the gas station icons and the parking icons are selected to be displayed.

Figure 5:
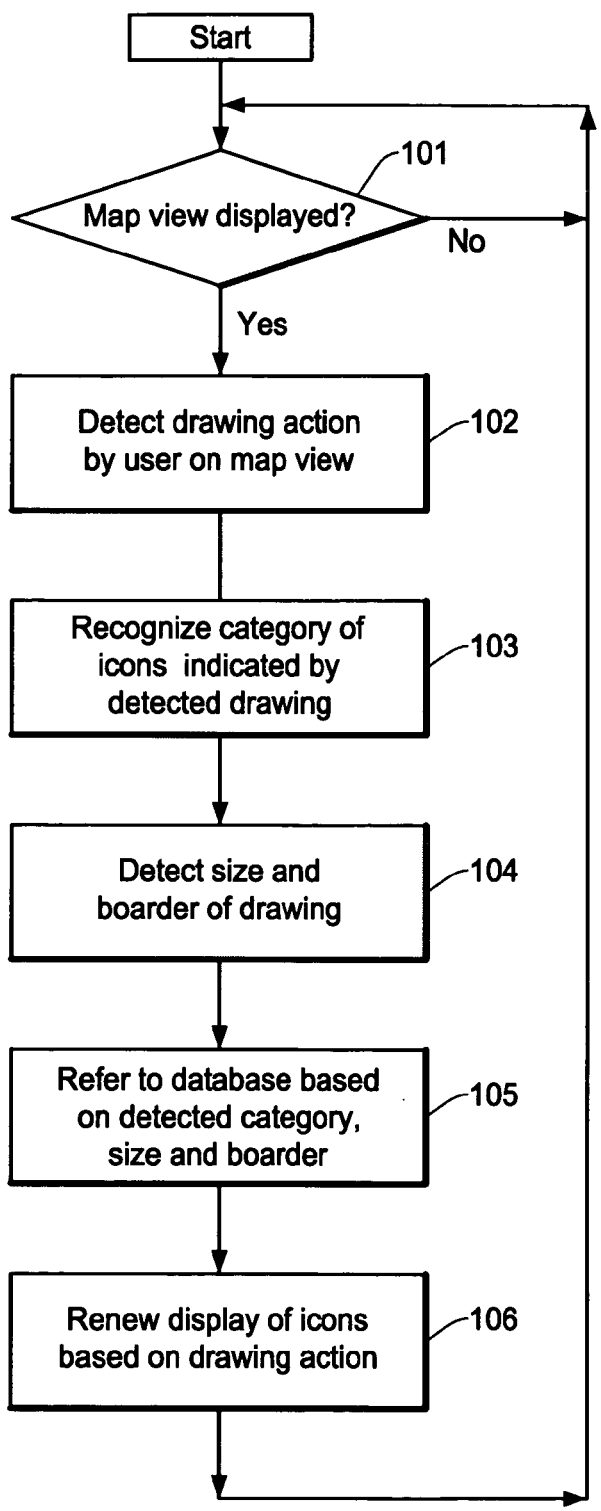
FIG. 5 is a flow chart showing an example of operational steps of the present invention for selecting the icons by using the character & symbol hand drawing.

FIG. 5 is a flow chart showing broadly the operational steps in the present invention for displaying icons on the map view selected by a character & symbol drawing. Typically, such a character & symbol drawing is handwritten by a user on the monitor screen which shows a map image or map view associated with the operation of the navigation system. As the process starts, at step 101, the navigation system determines whether a map view is displayed on the monitor screen, such as shown in the display examples of FIGS. 2A-2C.

The character & symbol drawing by the user will be accepted by the navigation system in a certain condition which will be refereed to as drawing reception condition. Typically, the drawing reception condition is satisfied if the monitor screen of the navigation system is in the map view mode and a map scale is small enough to show icons on the monitor screen. When the screen of the navigation system is not in the drawing reception condition, the navigation system would not accept a character & symbol drawing by the user.

If the display is in the drawing reception condition, in step 102, the navigation system will detect the character & symbol drawing 41 such as a letter "G" shown in FIGS. 2A-2D. In step 103, the navigation system checks and recognizes the category of icons expressed by the character & symbol drawing written by the user, i.e, gas stations for the character "G" in the above example. Then, in step 104, the navigation system will detect the size and boarder of the character & symbol drawing to determine an applicable area for displaying the selected icons. An example of the applicable area is shown in FIG. 2C which is indicated by the dotted lines with the reference number 45.

In step 105, the category, size and application area indicated by the character & symbol drawing 41 are checked with respect to the data in the map database of the navigation system for searching the matching entries. That is, in the example in FIGS. 2A to 2D, it will be checked whether there are icons in the category of gas station indicated by the character & symbol drawing "G". Finally, at step 106, the navigation system will renew the display of icons on the map view to show only the selected icons within the application area. In the above process, the order of performing the step 103 for recognizing the icon category and the step 104 for detecting the size and boarder of the application area may be exchangeable.

An example of method for determining an applicable area and its variants will be described in more detail with reference to FIGS. 6A to 6D. In the example shown in FIG. 6A, it is assumed that a character & symbol drawing 61 that is shaped like a character "P" is given through a handwriting action by the user. A surrounding rectangle 81 shown in FIGS. 6A-6C is the smallest rectangle that are inwardly tangential to the outer shape of the character & symbol drawing 61, thus representing the outer size of the character & symbol drawing 61.

Figure 6A:
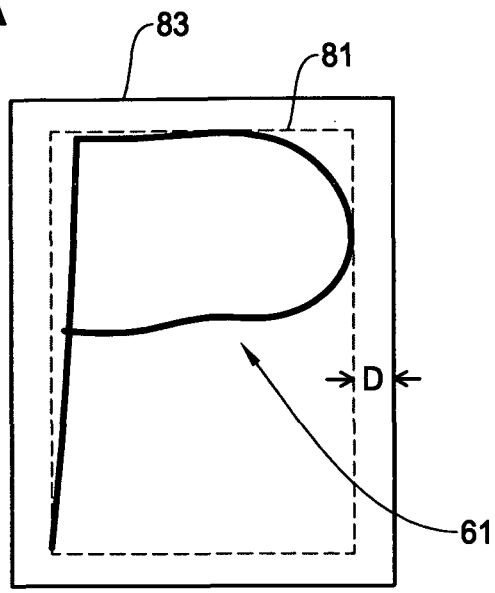
FIGS. 6A to 6D are schematic views showing methods of determining an applicable area on a screen for selecting the icons in the present invention where the applicable area is established based on a predetermined distance in FIG. 6A, the applicable area is established based on a center point of the drawing in FIG. 6B, the applicable area is a circle established based on a center point of the drawing in FIG. 6C, and the applicable area is established by dragging the corner point in FIG. 6D.

An applicable area 83 is generated by offsetting a predetermined offset distance D from the minimum surrounding rectangle 81 as shown in FIG. 6A. For instance, the offset distance D may be a quarter inch long on the monitor screen, or it may be 20 pixels on the monitor screen. As noted above, the applicable area 83 is an area on the map view that is affected by the selection operation of icons to be displayed based on the character & symbol drawing in the present invention. It is also possible to take the minimum surrounding rectangle 81 as an applicable area 83 without adding the predetermined offset distance D.

Figure 6B:
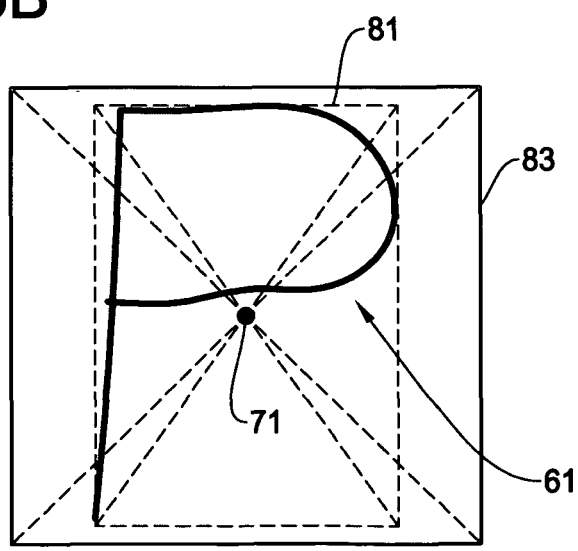

FIG. 6B shows another example of method for determining an applicable area 83 in which the minimum surrounding rectangle 81 is generated in the same manner as in FIG. 6A. A center point 71 of the minimum surrounding rectangle 81 is determined, for example, by drawing two diagonal lines with respect to the corners of the minimum surrounding rectangle 81. The applicable area 83 shaped in the form of a square or an equilateral square can be established with reference to the center point 71.

Figure 6C:
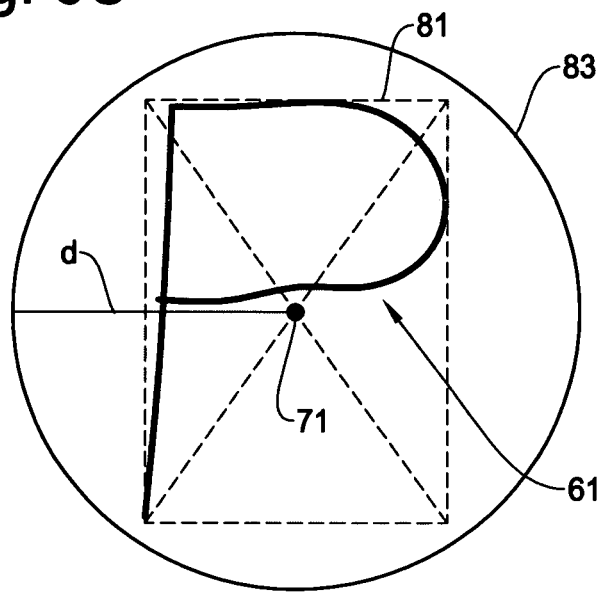

FIG. 6C shows a further example to determine an applicable area 83 in which the minimum surrounding rectangle 81 is generated in the same manner as in FIGS. 6A and 6B. In this example, similar to the method of FIG. 6B, a center point 71 of the minimum surrounding rectangle 81 is determined. Then, with reference to the center point 71, a circle is generated with a predetermined diameter d that can encompass the minimum surrounding rectangle 81, and such a circle is defined as the applicable area 83. In other words, the shape of the applicable area 83 can take not only a square or rectangle, but also a circle, ellipse or any other shapes as well.

Figure 6D:
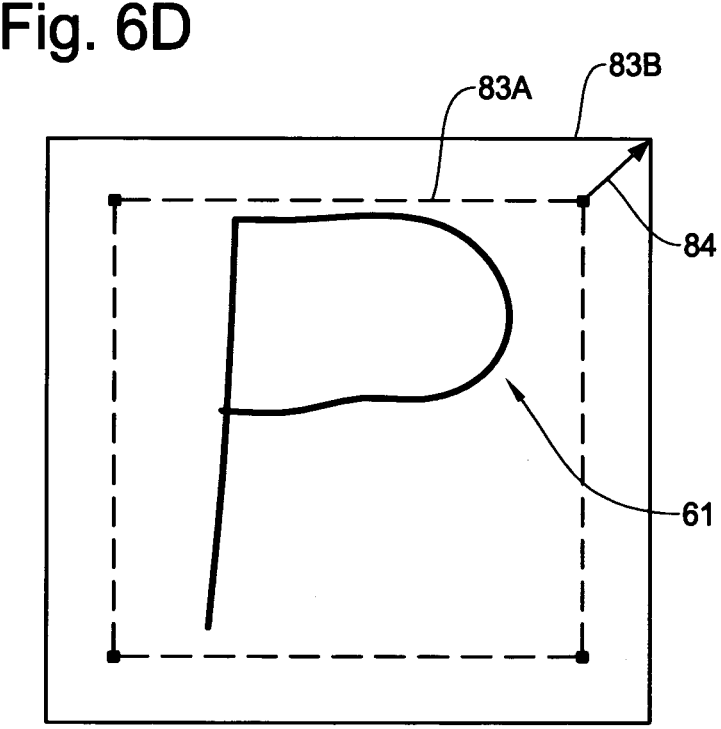

FIG. 6D shows an example where the user is able to adjust the size of the applicable area 83 after writing the character & symbol drawing. It is assumed that the dotted line indicates an original applicable area 83A that is obtained in the manner described with reference to FIG. 6B. After the original applicable area 83A is displayed on the screen, the user is able to change the size of the applicable area by dragging its corner. In the example of FIG. 6D, the corner point is dragged outward as shown by an arrow 84 to enlarge the original applicable area 83A to a re-sized applicable area 83B.

In the above examples, the user hand-writes the character & symbol drawing on the touch screen to display the selected icons in a specified area (applicable area). However, the present invention is not limited to the above examples, and other applications may be implemented based on the same concept. For example, the character & symbol drawing is used to eliminate a certain category of icons rather than selecting the category. Thus, in such a case, if the user writes the character & symbol drawing "R" which means restaurant icons, icons other than restaurants will be displayed without showing the restaurant icons.

Figure 7A:
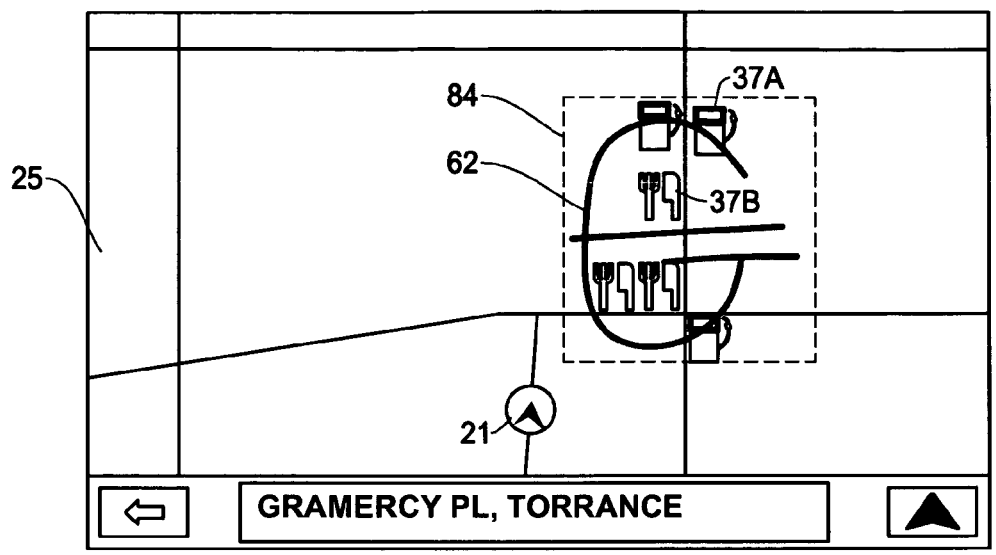
FIGS. 7A to 7B are display examples showing another example of operational process of the present invention for selecting icons by using the character & symbol hand drawing where
Figure 7B:
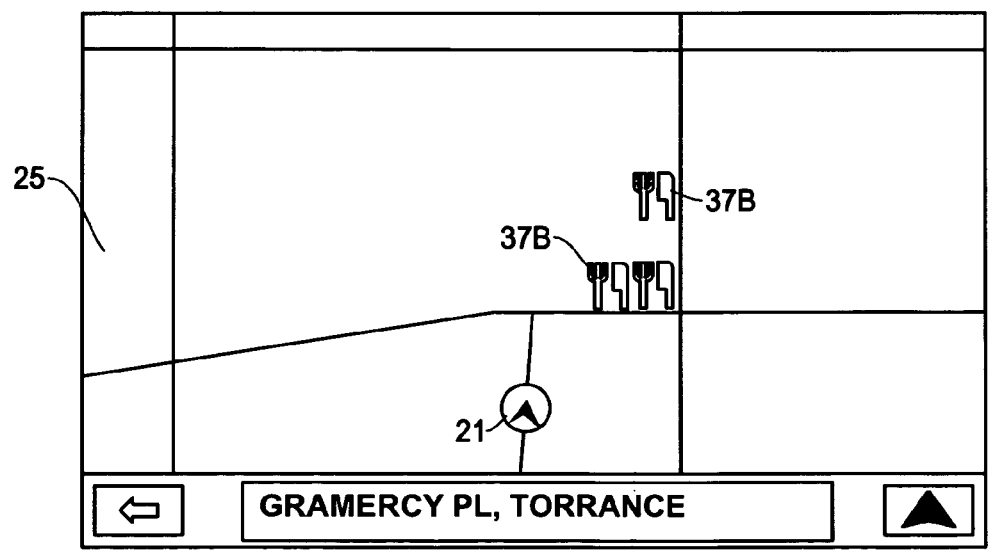

Such an example is further shown in FIGS. 7A-7B which are display examples of operational process of the present invention for selecting icons by using character & symbol hand drawing. FIG. 7A shows a plurality of icons and a character & symbol drawing, and FIG. 7B shows a resultant display in which the character & symbol drawing in FIG. 7A has been used to eliminate certain icons from the map image on the display. In other words, the character & symbol drawing is used to select a category of icons that should not be displayed on the map image.

In FIG. 7A, a plurality of gas station icons 37A and restaurant icons 37B are shown in the applicable area 84 on the map image. In this example, the user has drawn the character & symbol drawing 62 that resembles "G" with a strikeout horizontal line (i.e., "G"). In this example, this means that the character & symbol drawing commands the navigation system to avoid the gas station icons in the applicable area from being displayed on the map image. As shown in FIG. 7B, as a result of the character & symbol drawing 62, the gas station icons are eliminated from the display remaining the restaurant icons 37B.

Figure 8:
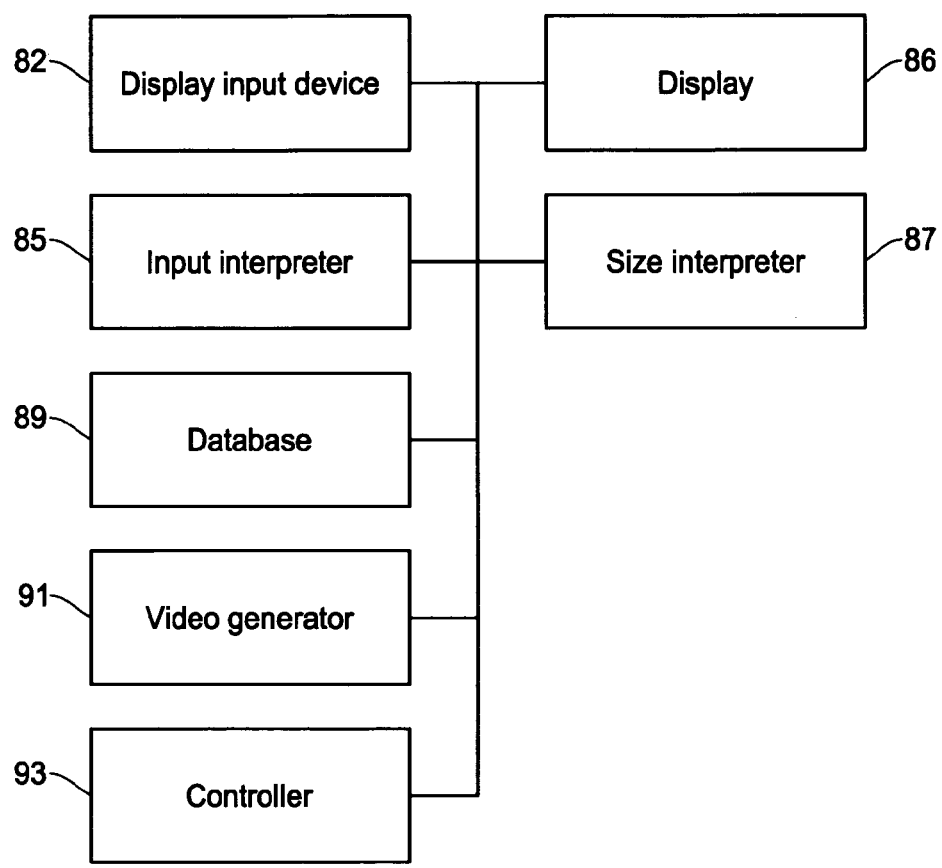
FIG. 8 is a schematic functional block view showing an example of functional configuration of the apparatus implementing the present invention.

FIG. 8 is a schematic view of basic blocks showing a functional structure of the apparatus for implementing the icon display method of the present invention. A display input device 82 is typically a monitor screen of an electronics device such as a navigation system used to display the map image and icons as well as to input the user's character & symbol drawing. Typically, the display input device 82 is a touch screen or multi-touch device to allow the user to hand-writes the character & symbol drawing on the screen.

A display 86 in this case is an object displayed on the monitor screen, thus, the display input device 82 and the display 86 are preferably integrated as one unit. An input interpreter 85 detects the input (character & symbol drawing) entered through the display input device 82 and determines the shape of the character & symbol drawing. To determine the shape of the character & symbol drawing in this case means to determine a category of the icons intended by the user to be displayed or removed.

A size interpreter 87 determines a size of the applicable area 83 such as the one described with reference to FIG. 6A-6D in which the icon display method of the present invention is affected. A database 89 stores icons and the corresponding character & symbol drawings typically in the form of data table as shown in FIG. 4B. The input interpreter 85 reads the data from the database 89 and compares the character & symbol drawing written by the user to determine which icon category of the icons has been specified by the user.

A video generator 91 generates video data for displaying the selected icons on the display 86. A controller 93 controls the overall operation of performing the character & symbol drawing recognition and displaying the image of icons on the display 83 based on the recognized character & symbol drawing. As noted above, the manner of selectively displaying the icons is affected only within the applicable area specified by the size of the character & symbol drawing as noted above.

FIG. 9 shows an embodiment of the structure of a vehicle navigation system for implementing the present invention of character & symbol drawing recognition. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage device 231 such as a hard disc, CD-ROM, DVD, memory device or other storage means for storing the map data. The navigation system includes a control unit 232 for controlling an operation for reading the information from the data storage device 231, and a position measuring device 233 for measuring the present vehicle position or user position. For example, the position measuring device 233 has a vehicle speed sensor for detecting a moving distance, a gyroscope for detecting a moving direction, a microprocessor for calculating a position, a GPS (global positioning system) receiver for global positioning based on GPS signals from artificial satellites, and etc.

The block diagram of FIG. 9 further includes a map information memory 234 for storing the map information which is read from data storage device 231, a database memory 235 for storing database information such as point of interest (POI) information which is read out from the data storage device 231, an input device 237 for executing a menu selection operation, an enlarge/reduce operation, a destination input operation, etc. and a remote controller interface 238. The input device can be a touch screen or multi-touch device.

In FIG. 9, the navigation system further includes a bus 236 for interfacing the above units in the system, a processor (CPU) 239 for controlling an overall operation of the navigation system, a ROM 240 for storing various control programs such as a route search program and a map matching program necessary for navigation control, a RAM 241 for storing a processing result such as a guide route, a display controller 243 for generating map image on the basis of the map information, a VRAM 244 for storing images generated by the display controller 243, a menu/list generating unit 245 for generating menu image/various list images, a synthesizing unit 246, a wireless communication device 249 for wireless communication to retrieve data from a remote server, a buffer memory 248 for temporally storing data for ease of data processing, and a monitor (display) 250.

The procedures described in the flow chart in FIG. 5 is performed by the CPU 239. The data storage device 231 stores the map data as well as the icon data. The character & symbol drawing received from the input device 237 or on the monitor screen 250 is compared to the icon data stored in the data storage device 231 to determine what type of icon has been selected. As a result of determining the type of icons and the applicable area, the display controller will update the display shown on the monitor screen 250 to show the desired icons on an applicable area.

As has been described above, according to the icon display method and apparatus of the present invention, the navigation system is able to display or avoid to display the selected category of icons based on the character & symbol drawing which is hand-written by the user. The navigation system is capable of selectively displaying or not displaying the icons based on the character & symbol drawing written by the user while applying the icon display operation to an applicable area on the monitor screen defined by the user. The navigation system allows the user to create a prescribed data table for interpreting the category of icons based on the character and symbol drawing. Thus, the user of the navigation system is able to distinguish information regarding a particular type of icons from that of the other icons when the icons are clustered to the same or nearby location on the map image, since the apparatus of the present invention enables to show only the desired type of icons on the screen.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for displaying icons representing a type of places of interest for a navigation system, comprising the following steps of:

checking, by using a processor, whether a map image is displayed on a monitor screen of a navigation system;

detecting an activity of hand-writing a character & symbol drawing by a user on the map image shown on the monitor screen;

determining a category of the icons intended by the user with respect the map image based on the character & symbol drawing specified by the user;

determining a minimum surrounding rectangle of the character & symbol drawing specified by the user where the minimum surrounding rectangle is a smallest rectangle inwardly tangential to an outer shape of the character & symbol drawing;

determining an applicable area on the map image for applying an icon display operation based on the minimum surrounding rectangle of the character & symbol drawing specified by the user;

checking a prescribed data table based on the category of the icons and the applicable area selected by the character & symbol drawing by the user in the foregoing steps; and changing the manner of displaying the icons on the map image with respect to the category and applicable area determined by the character & symbol drawing: and wherein the character & symbol drawing is a handwritten drawing by the user that serves to define both the category of the icons and the applicable area at the same time.

2. A method for displaying icons as defined in claim 1, further comprising a step of creating the data table listing information regarding relationships between predefined character & symbols and categories of icons so that the category of icons intended by the user is determined by comparing the character & symbol drawing that is handwritten by the user with the information in the data table.

3. A method for displaying icons as defined in claim 1, further comprising a step of determining whether the navigation system is in a drawing reception condition when the user has hand-written the character & symbol drawing on the map image where the drawing reception condition includes a condition where a map scale is appropriate for displaying icons on the monitor screen.

4. A method for displaying icons as defined in claim 1, wherein said step of changing the manner of displaying the icons on the map image includes a step of either displaying the selected category of icons or avoiding from displaying the selected category of icons on the applicable area on the map image.

5. A method for displaying icons as defined in claim 4, wherein said step of avoiding from displaying the selected category of icons includes a step of hand-writing a cross-out mark over the character & symbol drawing on the map image on the monitor screen.

6. A method for displaying icons as defined in claim 1, wherein said step of changing the manner of displaying the icons on the map image includes a step of displaying the selected category of icons on the applicable area on the map image where no icons are previously displayed.

7. A method for displaying icons as defined in claim 1, wherein said character & symbol drawing is an alphabetical letter associated with a category of icons or a symbol figure related to a function of a particular place and is interpreted by the information listed in the prescribed data table.

8. A method for displaying icons as defined in claim 1, wherein said applicable area for applying the icon display operation is determined based on an outer size or shape of the character & symbol drawing that is hand-written by the user.

9. A method for displaying icons as defined in claim 1, wherein said applicable area for applying the icon display operation is determined based on an outer size or shape of the hand-written character & symbol drawing and a center point of the character & symbol drawing by producing a circle or a rectangle shape with reference to the center point where the circle or rectangle is larger than the outer size or shape of the character & symbol drawing.

10. A method for displaying icons as defined in claim 1, wherein said applicable area for applying the icon display operation is determined based on an outer size of the character & symbol drawing that is hand-written by the user and is adjusted by the user by dragging a corner point of the applicable area.

11. An apparatus for displaying icons representing a type of places of interest for a navigation system, comprising:

a storage device configured to store map data, a prescribed data table including icon data, and programs;

a monitor screen configured to display images and texts related operations of the navigation system;

an input device configured to input information by a user including a handwritten drawing; and a central processing unit configured, by executing the programs in the storage device, to conduct the following operations of:

checking whether a map image is displayed on the monitor screen of the navigation system;

detecting an activity of hand-writing a character & symbol drawing by a user on the map image shown on the monitor screen;

determining a category of the icons intended by the user with respect the map image based on the character & symbol drawing specified by the user;

determining a minimum surrounding rectangle of the character & symbol drawing specified by the user where the minimum surrounding rectangle is a smallest rectangle inwardly tangential to an outer shape of the character & symbol drawing;

determining an applicable area on the map image for applying an icon display operation based on the minimum surrounding rectangle of the character & symbol drawing specified by the user;

checking the icon data in the prescribed data table based on the category of the icons and the applicable area selected by the character & symbol drawing by the user in the foregoing operations; and changing the manner of displaying the icons on the map image with respect to the category and applicable area determined by the character & symbol drawing: and wherein the character & symbol drawing is a handwritten drawing by the user that serves to define both the category of the icons and the applicable area at the same time.

12. An apparatus for displaying icons as defined in claim 11, the central processing unit further conducts an operation of creating the data table listing information regarding relationships between predefined character & symbols and categories of icons so that the category of icons intended by the user is determined by comparing the character & symbol drawing that is hand-written by the user with the information in the data table.

13. An apparatus for displaying icons as defined in claim 11, the central processing unit further conducts an operation of determining whether the navigation system is in a drawing reception condition when the user has hand-written the character & symbol drawing on the map image where the drawing reception condition includes a condition where a map scale is appropriate for displaying icons on the monitor screen.

14. An apparatus for displaying icons as defined in claim 11, wherein said operation of changing the manner of displaying the icons on the map image includes an operation of either displaying the selected category of icons or avoiding from displaying the selected category of icons on the applicable area on the map image.

15. An apparatus for displaying icons as defined in claim 14, wherein said operation of avoiding from displaying the selected category of icons includes an operation of hand-writing a cross-out mark over the character & symbol drawing on the map image on the monitor screen.

16. An apparatus for displaying icons as defined in claim 11, wherein said operation of changing the manner of displaying the icons on the map image includes an operation of displaying the selected category of icons on the applicable area on the map image where no icons are previously displayed.

17. An apparatus for displaying icons as defined in claim 11, wherein said character & symbol drawing is an alphabetical letter associated with a category of icons or a symbol figure related to a function of a particular place and is interpreted by the information listed in the prescribed data table.

18. An apparatus for displaying icons as defined in claim 11, wherein said applicable area for applying the icon display operation is determined based on an outer size or shape of the character & symbol drawing that is hand-written by the user.

19. An apparatus for displaying icons as defined in claim 11, wherein said applicable area for applying the icon display operation is determined based on an outer size or shape of the hand-written character & symbol drawing and a center point of the character & symbol drawing by producing a circle or a rectangle shape with reference to the center point where the circle or rectangle is larger than the outer size or shape of the character & symbol drawing.

20. An apparatus for displaying icons as defined in claim 11, wherein said applicable area for applying the icon display operation is determined based on an outer size of the character & symbol drawing that is hand-written by the user and is adjusted by the user by dragging a corner point of the applicable area.

* * * * *